US012322076B2

(12) United States Patent
Shan et al.

(10) Patent No.: US 12,322,076 B2
(45) Date of Patent: Jun. 3, 2025

(54) REMOTE SENSING IMAGE GEOMETRIC NORMALIZATION METHOD AND APPARATUS

(71) Applicant: AEROSPACE INFORMATION RESEARCH INSTITUTE, CHINESE ACADEMY OF SCIENCES, Beijing (CN)

(72) Inventors: Xiaojun Shan, Beijing (CN); Ping Tang, Beijing (CN); Changmiao Hu, Beijing (CN); Hongyi Li, Beijing (CN); Zheng Zhang, Beijing (CN); Ke Zheng, Beijing (CN)

(73) Assignee: AEROSPACE INFORMATION RESEARCH INSTITUTE, CHINESE ACADEMY OF SCIENCES, Beijing (CN)

( * ) Notice: Subject to any disclaimer, the term of this patent is extended or adjusted under 35 U.S.C. 154(b) by 617 days.

(21) Appl. No.: 17/641,671

(22) PCT Filed: Oct. 17, 2019

(86) PCT No.: PCT/CN2019/111567
§ 371 (c)(1),
(2) Date: Sep. 16, 2022

(87) PCT Pub. No.: WO2021/046964
PCT Pub. Date: Mar. 18, 2021

(65) Prior Publication Data
US 2023/0005109 A1    Jan. 5, 2023

(30) Foreign Application Priority Data
Sep. 10, 2019   (CN) .......................... 201910856936.7

(51) Int. Cl.
*G06T 5/80*  (2024.01)
*G06T 7/00*  (2017.01)

(52) U.S. Cl.
CPC .............. *G06T 5/80* (2024.01); *G06T 7/0002* (2013.01); *G06T 2207/10032* (2013.01);
(Continued)

(58) Field of Classification Search
CPC .......... G06T 2207/10032; G06V 20/10; G06V 10/20
See application file for complete search history.

(56) References Cited

U.S. PATENT DOCUMENTS

2002/0172429 A1 * 11/2002 Boliek ................... H04N 19/63
                                                  375/E7.064
2007/0252834 A1 * 11/2007 Fay ....................... G06T 3/4092
                                                      345/428
(Continued)

FOREIGN PATENT DOCUMENTS

CN    101216555        7/2008
CN    101216555 A  *   7/2008
(Continued)

OTHER PUBLICATIONS

Guo et al., An Efficient Tile-Pyramids Building Method for Fast Visualization of Massive Geospatial Raster Datasets, Jan. 2016, Advances in Electrical and Computer Engineering, 16(4), pp. 3-8, DOI: 10.4316/AECE.2016.04001.*

(Continued)

*Primary Examiner* — Guillermo M Rivera-Martinez
(74) *Attorney, Agent, or Firm* — Volpe Koenig

(57) ABSTRACT

A remote sensing image geometric normalization method and apparatus. The method comprises: constructing a pyramid tile structure for a reference image, and releasing reference tile data; calculating the level of a tile to be
(Continued)

downloaded and the name of the tile to be downloaded, and downloading corresponding data from the reference tile data to obtain a standard tile set; performing first geometric correction on the image to be subjected to geometric normalization and tiles in the standard tile set to obtain a first image processing result; matching the first image processing result with the tiles in the standard tile set to obtain a plurality of control points, and calculating a result evaluation precision; and determining whether to perform second geometric correction on the first image processing result.

18 Claims, 7 Drawing Sheets

(52) U.S. Cl.
CPC ............ *G06T 2207/20016* (2013.01); *G06T 2207/20021* (2013.01); *G06T 2207/30168* (2013.01)

(56) References Cited

U.S. PATENT DOCUMENTS

| | | | | |
|---|---|---|---|---|
| 2010/0229115 | A1* | 9/2010 | Augustine | G06F 3/1454 715/800 |
| 2011/0243438 | A1* | 10/2011 | Hoppe | G06T 3/4007 382/167 |
| 2013/0089249 | A1* | 4/2013 | Mueller | G06V 20/695 382/128 |
| 2014/0152494 | A1* | 6/2014 | MacGougan | G01S 19/03 342/357.39 |
| 2016/0300375 | A1* | 10/2016 | Beckett | G06F 16/248 |
| 2019/0034725 | A1* | 1/2019 | Tyburski | G06T 7/11 |

FOREIGN PATENT DOCUMENTS

| | | | | |
|---|---|---|---|---|
| CN | 102073990 | 5/2011 | | |
| CN | 102213762 | 10/2011 | | |
| CN | 103383773 | 11/2013 | | |
| CN | 103413272 | 11/2013 | | |
| CN | 103984759 | 8/2014 | | |
| CN | 106886794 | 6/2017 | | |
| CN | 106886794 A | * 6/2017 | ........... G06K 9/0063 | |
| CN | 107239531 | 10/2017 | | |
| CN | 107239531 A | * 10/2017 | ............. G06F 16/16 | |
| CN | 108830889 | 11/2018 | | |
| CN | 109887010 | 6/2019 | | |
| CN | 109903352 | 6/2019 | | |
| KR | 20180127567 | 11/2018 | | |
| KR | 20190026452 | 3/2019 | | |
| WO | WO-2005089434 A2 | * 9/2005 | ............. G01C 21/32 | |
| WO | WO-2006052390 A2 | * 5/2006 | ......... G06F 16/9577 | |

OTHER PUBLICATIONS

Hao et al., "An angle-based method of on-orbit geometric calibration for the push-broom CCD camera"; Chinese Science: Information Science vol. 41.
Notice to Grant and Search Report issued by the CNIPA in corresponding Chinese Application No. 2019108569367 on Mar. 23, 2022.
Shan et al., "An automatic geometric precision correction system based on hierarchical registration for HJ-1 A/B CCD images", *International Journal of Remote Sensing*, 35(20):7154-7178, 2014.
Shan et al., "Automatic geometric precise correction technology and system based on hierarchical image matching for HJ-1 A/B CCD images", *Journal of Remote Sensing*, 18(2):254-266, 2014.
Venkatesan et al., "A Study On the Geometric Correction Using Satellite Images", *International Journal of Pure and Applied Mathematics*, 116(16):471-477, 2017.
International Search Report issued in Corresponding PCT Application No. PCT/CN2019/111567, Dated Jun. 4, 2020 (English Translation).
Liang et al., "Design and implementation of automatic accurate geometric correction system fot HJ-1 CCD images" *Journal of Computer Applications* 2012, 32(S2):237-241 (English Abstract).
Office Action and Search Report issued in Corresponding Chinese Application No. 201910856936.7, dated Sep. 28, 2021 (English Translation provided).

* cited by examiner

REMOTE SENSING IMAGE GEOMETRIC NORMALIZATION METHOD AND APPARATUS

CROSS-REFERENCE TO RELATED APPLICATIONS

This application is a national phase application under 35 U.S.C. § 371 of International Application No. PCT/CN2019/111567 filed 17 Oct. 2019, which claims priority to Chinese Patent Application No. 201910856936.7 filed 10 Sep. 2019. The entire contents of each of the above-referenced disclosures is specifically incorporated by reference herein without disclaimer.

TECHNICAL FIELD

The present disclosure relates to the field of image processing, and in particular, to a remote sensing image geometric normalization method.

BACKGROUND

In recent years, with continuous launch of different types of remote sensing satellites, there are more and more images with different resolutions of different sensors, making application of remote sensing images in land use, resource survey, land cover, environmental monitoring, and the like increase. At present, due to the influence of weather and satellite imaging time, data amount of images of a single sensor cannot meet the requirements of practical applications in large areas or around the world. Therefore, the integrated use of multi-sensor data is increasing. However, due to different imaging methods, different satellite platforms, and imaging parameters of different precisions, multi-source remote sensing images are not completely consistent in geographic space. Therefore, in a case of integrated using the multi-source remote sensing images, geometric normalization processing must be performed to keep them consistent in geographic space.

SUMMARY

Embodiments of the present disclosure provide an image processing method and apparatus, so as to solve one or more technical problems in the prior art.

According to a first aspect, an embodiment of the present disclosure provides a remote sensing image geometric normalization method, including:
constructing a pyramid tile structure for a reference image, and releasing reference tile data, wherein the reference tile data is data in the pyramid tile structure;
calculating a level of a tile to be downloaded and a name of the tile to be downloaded according to a resolution and geographic coordinates of an image to be subjected to geometrical normalization, and downloading corresponding data from the reference tile data according to the level of the tile to be downloaded and the name of the tile to be downloaded, to obtain a standard tile set;
performing a first geometric correction on the image to be subjected to geometrical normalization and tiles in the standard tile set, to obtain a first image processing result;
matching the first image processing result with the tiles in the standard tile set, to obtain a plurality of control points, and calculating a result evaluation precision by using the plurality of control points; and
determining whether to perform a second geometric correction on the first image processing result, according to the result evaluation precision.

In an implementation, the method further includes:
in a case that the result evaluation precision is higher than a preset precision, performing the second geometric correction on the first image processing result in combination with the standard tile set, to obtain a second image result.

In an implementation, the constructing the pyramid tile structure for the reference image, and releasing the reference tile data, includes:
determining a number of levels of tiles in a pyramid tile structure to be constructed and an image resolution of each of the levels;
slicing the reference image in accordance with a preset level and a preset resolution to construct the pyramid tile structure; and
releasing the reference tile data through a web map tile service protocol.

In an implementation, the performing the first geometric correction on the image to be subjected to geometrical normalization and the tiles in the standard tile set, includes:
in a case that a resolution of the image to be subjected to geometrical normalization is higher than a preset resolution threshold, performing a rational polynomial coefficients (RPC, Rational Polynomial Coefficients) correction on the image to be subjected to geometrical normalization; and
in a case that the resolution of the image to be subjected to geometrical normalization is lower than or equal to the resolution threshold, performing a correction according to locating information of the image to be subjected to geometrical normalization.

In an implementation, the performing the RPC correction on the image to be subjected to geometrical normalization, includes:
selecting the tiles from the standard tile set based on a sampling interval, according to an arrangement order of the tiles in the standard tile set, to perform image matching on the image to be subjected to geometrical normalization, to obtain the control points;
updating an RPC parameter by using the control points; and
performing the RPC correction on the image to be subjected to geometrical normalization by using an updated RPC parameter through a digital elevation model.

In an implementation, the calculating the result evaluation precision by using the plurality of control points, includes:
calculating a mean square error of the first image processing result relative to the reference image according to the control points, and determining the mean square error as the result evaluation precision;
wherein a formula of calculating the result evaluation precision is:

$$RMSE = \sqrt{(x_i - x_i')^2 + (y_i - y_i')^2}$$

wherein RMSE (Root-Mean-Square Error) is the evaluation precision, $(x_i, y_i)$ are coordinates of a control point i on the first image processing result, and $(x_i', y_i')$ are coordinates on the first image processing result to which coordinates of the control point i on the reference image are converted according to geographic coordinates.

According to a second aspect, an embodiment of the present disclosure provides a remote sensing image geometric normalization apparatus, including:
- a constructing module, configured for constructing a pyramid tile structure for a reference image, and releasing reference tile data, wherein the reference tile data is data in the pyramid tile structure;
- a download module, configured for calculating a level of a tile to be downloaded and a name of the tile to be downloaded according to a resolution and geographic coordinates of an image to be subjected to geometrical normalization, and downloading corresponding data from the reference tile data according to the level of the tile to be downloaded and the name of the tile to be downloaded, to obtain a standard tile set;
- a first geometric correction module, configured for performing a first geometric correction on the image to be subjected to geometrical normalization and tiles in the standard tile set, to obtain a first image processing result;
- an evaluation module, configured for matching the first image processing result with the tiles in the standard tile set, to obtain a plurality of control points, and calculating a result evaluation precision by using the plurality of control points; and
- a determining module, configured for determining whether to perform a second geometric correction on the first image processing result, according to the result evaluation precision.

In an implementation, the apparatus further includes a second geometric correction module, configured for: in a case that the result evaluation precision is higher than a preset precision, performing the second geometric correction on the first image processing result in combination with the standard tile set, to obtain a second image result.

In an implementation, the constructing module includes:
- an initial unit, configured for determining a number of levels of tiles in a pyramid tile structure to be constructed and an image resolution of each of the levels;
- a slicing unit, configured for slicing the reference image in accordance with a preset level and a preset resolution to construct the pyramid tile structure; and
- a releasing unit, configured for releasing the reference tile data through a web map tile service protocol.

In an implementation, the first geometric correction module includes:
- an RPC correction unit, configured for: in a case that a resolution of the image to be subjected to geometrical normalization is higher than a preset resolution threshold, performing an RPC correction on the image to be subjected to geometrical normalization; and
- a locating information correction unit, configured for: in a case that the resolution of the image to be subjected to geometrical normalization is lower than or equal to the resolution threshold, performing a correction according to locating information of the image to be subjected to geometrical normalization.

An embodiment in the above disclosure has the following advantages or beneficial effects that: the present disclosure uses a unified reference to realize geometric normalization processing of multi-scale remote sensing images, and overcomes the problems of inconsistency in the spatial position of multi-scale images caused by using a plurality of references in traditional methods, large workload for reference image preparation, and low parallel processing efficiency. On the one hand, true geometric normalization processing of multi-scale images can be achieved; on the other hand, the reference tile data can be obtained by being deployed on a plurality of computers through the network, to complete large-scale parallel processing of large number of images, and improve the processing capacity of large data amount images.

Other effects of the foregoing optional manners will be described below in combination with specific embodiments.

BRIEF DESCRIPTION OF THE DRAWINGS

The drawings are used to better understand the scheme and do not constitute a limitation to the present disclosure. In which.

DETAILED DESCRIPTION

Exemplary embodiments of the present disclosure are described below in combination with the drawings, including various details of the embodiments of the present disclosure to facilitate understanding, which should be considered as exemplary only. Thus, those of ordinary skill in the art should realize that various changes and modifications can be made to the embodiments described here without departing from the scope and spirit of the present disclosure. Likewise, descriptions of well-known functions and structures are omitted in the following description for clarity and conciseness.

In the related art, for images of different scales, reference images with different resolutions are used to perform image registration, thereby completing the geometric normalization. This approach requires preparation of the reference images with different resolutions, which greatly increases the workload of reference data preparation. Maybe due to inconsistency of different reference images in geographic space, geometric positions of images with different resolutions are also inconsistent, and geometric normalization of multi-scale images cannot be truly achieved. In addition, the reference images are stored in the form of a single file, and the geometric normalization processing can only be performed on a desktop computer or a server storing the reference images, and a plurality of devices cannot be used for parallel processing at the same time.

Figure 1:
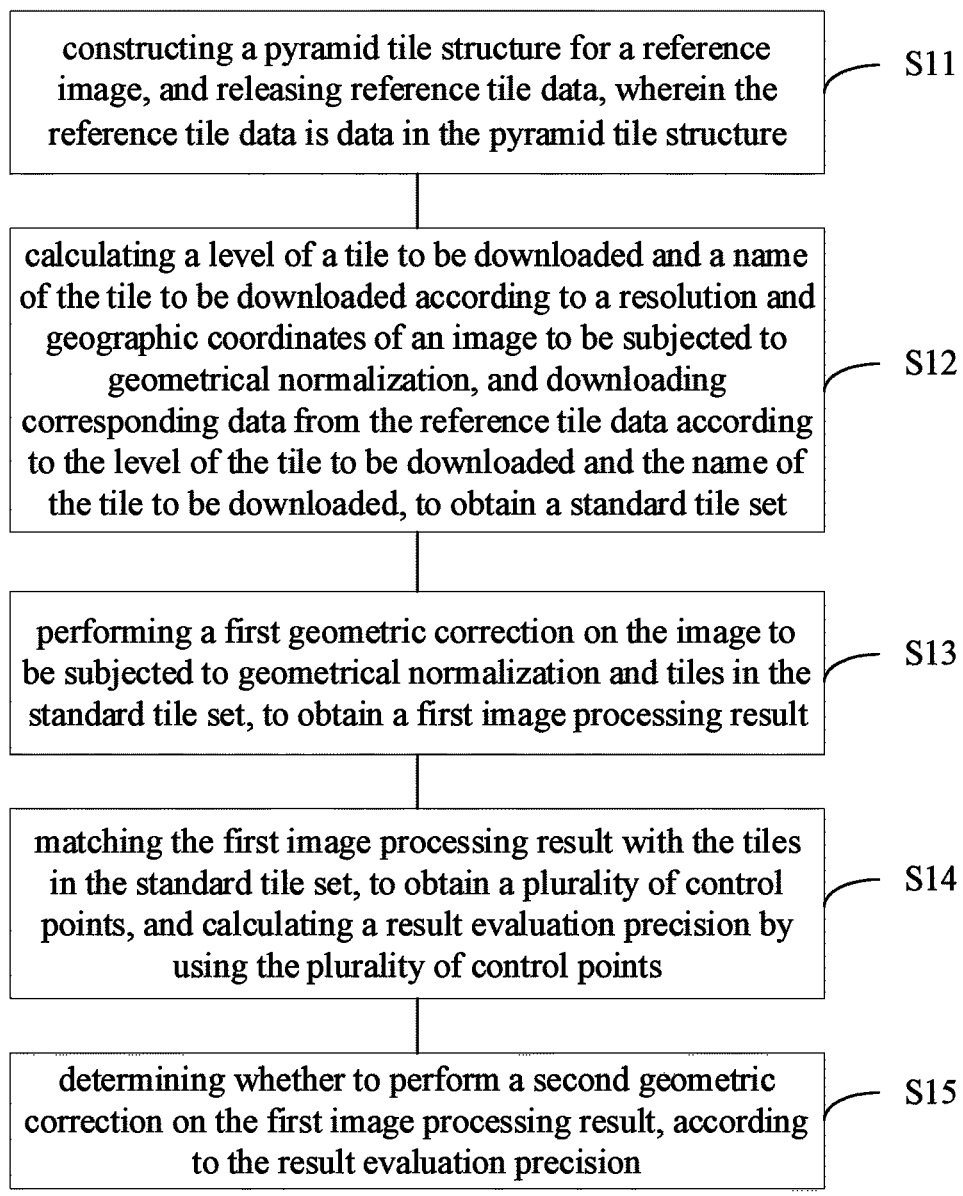
FIG. 1 shows a flowchart of a remote sensing image geometric normalization method according to an embodiment of the present disclosure.

FIG. 1 shows a flowchart of a remote sensing image geometric normalization method according to an embodiment of the present disclosure. As shown in FIG. 1, the remote sensing image geometric normalization method includes:

S11: constructing a pyramid tile structure for a reference image, and releasing reference tile data, wherein the reference tile data is data in the pyramid tile structure.

In an implementation, the constructing the pyramid tile structure for the reference image, and releasing the reference tile data, includes:

determining the number of levels of tiles in a pyramid tile structure to be constructed and an image resolution of each of the levels;

Specifically, it is necessary to perform image resampling and slicing on all reference images to construct reference tile data in a pyramid structure. In a case of constructing a pyramid tile, first, the number of levels of the tiles and an image resolution of each of the levels are determined. Usually, the image resolutions to be processed range from the centimeter-level to the kilometer-level. Therefore, in a case of constructing a tile data structure, the resolutions should cover resolutions ranging from the centimeter-level to the kilometer-level.

slicing the reference image in accordance with a preset level and a preset resolution to construct the pyramid tile structure; and Specifically, a size and the naming rule of the tile also need to be determined. The size of the tile is usually 256*256 or 512*512, and a file may be named by a row number, a column number, and a level of the tile.

releasing the reference tile data through a web map tile service protocol.

Specifically, after the reference image is sliced in accordance with a set level and resolution, the data is released by using the WMTS (Web Map Tile Service) protocol. During the geometric normalization after the releasing, the tile data may be downloaded through the WMTS protocol.

S12: calculating a level of a tile to be downloaded and a name of the tile to be downloaded according to a resolution and geographic coordinates of an image to be subjected to geometrical normalization, and downloading corresponding data from the reference tile data according to the level of the tile to be downloaded and the name of the tile to be downloaded, to obtain a standard tile set.

Specifically, before the geometric normalization, it is first necessary to determine the level of the obtained tile according to the resolution of the image to be processed. A determination standard is that the resolution of the level of the tile is similar to the resolution of the image to be processed, and the resolution of the image to be processed is better than the resolution of the level of the tile. After the level of the tile is determined, the number of tiles to be obtained and the tile file names are calculated and determined according to a geographic space range of the image to be processed and the naming rule of the tile file. Then all tile data is downloaded through a multi-threading manner.

S13: performing a first geometric correction on the image to be subjected to geometrical normalization and tiles in the standard tile set, to obtain a first image processing result.

In an implementation, the performing the first geometric correction on the image to be subjected to geometrical normalization and the tiles in the standard tile set, includes:

in a case that a resolution of the image to be subjected to geometrical normalization is higher than a preset resolution threshold, performing a rational polynomial coefficients RPC correction on the image to be subjected to geometrical normalization; and Specifically, at present, for high-resolution images, all images obtained by users are images with the RPC parameter, and the RPC correction needs to be performed before use.

in a case that the resolution of the image to be subjected to geometrical normalization is lower than or equal to the resolution threshold, performing a correction according to locating information of the image to be subjected to geometrical normalization.

Specifically, low-resolution images have generally their own latitude and longitude data. Therefore, for the low-resolution images, a rough geometric correction (the first geometric correction) is performed by using their own longitude and latitude data. In the rough geometric correction (the first geometric correction), since their own longitude and latitude data may not be consistent with the size of the image, first, it is necessary to interpolate the longitude and latitude data to generate longitude and latitude data that is consistent with the size of the original image, and then the interpolated latitude and longitude data is used to perform geometric positioning of the original image to generate a remote sensing image with projection information.

In an implementation, the performing the RPC correction on the image to be subjected to geometrical normalization, includes:

selecting the tiles from the standard tile set based on a sampling interval, according to an arrangement order of the tiles in the standard tile set, to perform image matching on the image to be subjected to geometrical normalization, to obtain the control points;

updating an RPC parameter by using the control points; and performing the RPC correction on the image to be subjected to geometrical normalization by using an updated RPC parameter through a digital elevation model.

Specifically, for most sensors, the RPC parameter is not accurate enough due to the influence such as a satellite attitude. Therefore, before the RPC correction, a small number of control points are required to optimize the RPC parameter, and then DEM (Digital Elevation Model) data and the optimized RPC parameter are used to perform the RPC correction. In order to ensure absolute geometric precision, it is usually carried out by manually collecting control points. In the present disclosure, in order to ensure relative consistency of the multi-scale images in a spatial position, the relative geometric precision is required. Therefore, an image matching method is used to obtain a small number of uniform control points. During the image matching, according to the arrangement order of the tile images, every M rows and N columns, a tile file is selected for the image matching, and sizes of M and N are determined according to the number and a range of the tile data. In a case that the tile data is matched with the image, an image area corresponding to the tile data is automatically estimated according to the RPC parameter, and then the commonly used SIFT (Scale-invariant feature transform), SURF (Speeded Up Robust Features), and other feature matching algorithms with scale and rotation invariant to perform automatic matching. After the automatic matching is completed, methods such as the RANSAC (RANdom SAmple Consensus) and the least square fit are used to eliminate wrong control points.

S14: matching the first image processing result with the tiles in the standard tile set, to obtain a plurality of control points, and calculating a result evaluation precision by using the plurality of control points.

In an implementation, a mean square error of the first image processing result relative to the reference image is calculated according to the control points, and the mean square error is determined as the result evaluation precision; wherein a formula of calculating the result evaluation precision is:

$$RMSE=\sqrt{(x_i-x_i')^2+(y_i-y_i')^2}$$

wherein RMSE is the evaluation precision, $(x_i, y_i)$ are coordinates of a control point i on the first image processing result, and $(x_i', y_i')$ are coordinates on the first image processing result to which coordinates of the control point i on the reference image are converted according to geographic coordinates.

Specifically, after the geometric correction is performed, the automatic image matching method is used to complete automatic matching of the tile data and the corrected image, and the control points are homogenized, and then these control points are used to calculate the mean square error (RMSE) of the corrected image relative to the reference image. The calculation formula is as follows:

$$RMSE=\sqrt{(x_i-x_i')^2+(y_i-y_i')^2}.$$

In the above formula, $(x_i, y_i)$ are coordinates of a control point i on the corrected image, and $(x_i', y_i')$ are coordinates on the corrected image to which coordinates of the control point i on the reference image are converted according to geographic coordinates.

S15: determining whether to perform a second geometric correction on the first image processing result, according to the result evaluation precision.

Figure 2:
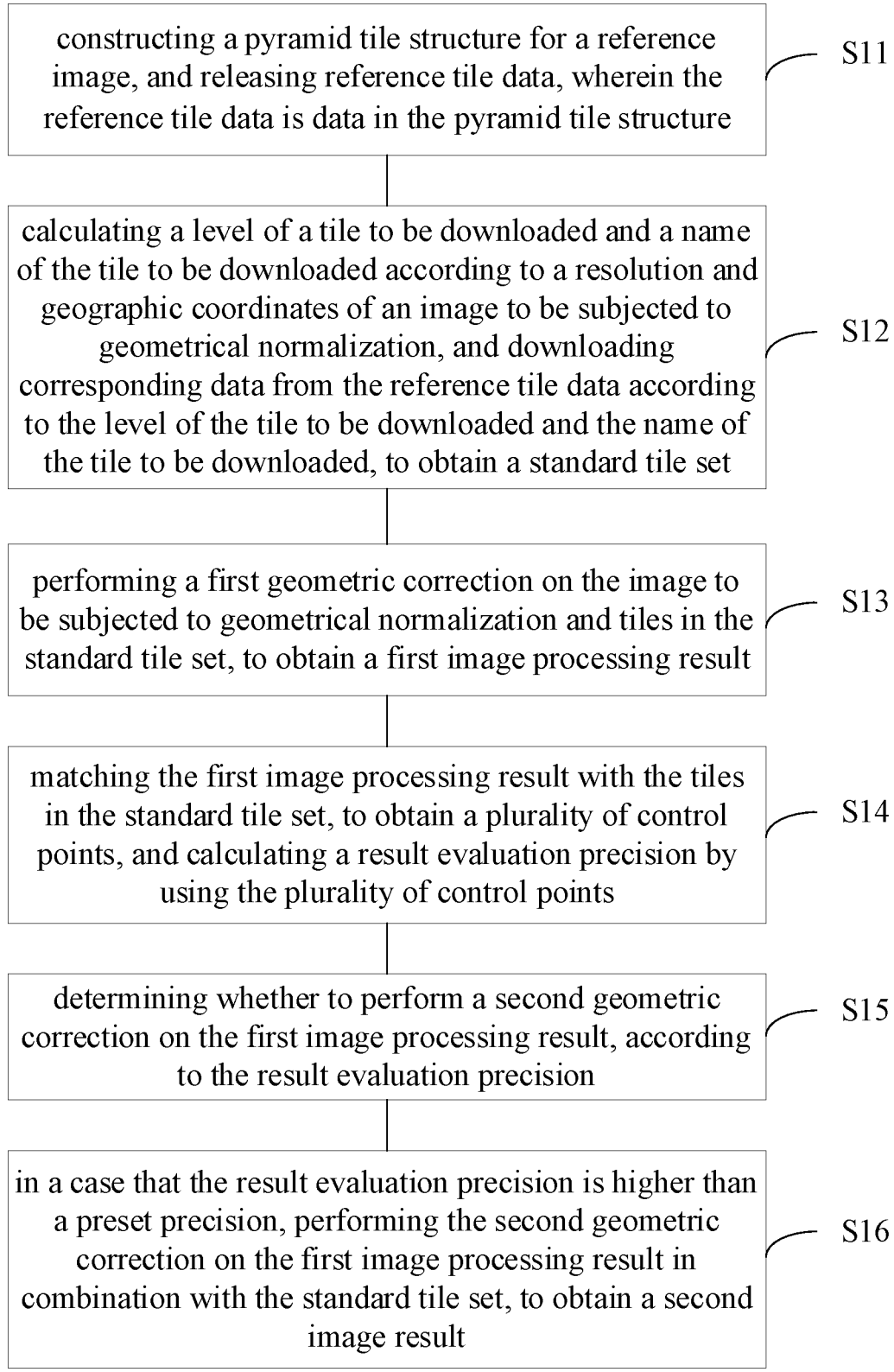
FIG. 2 shows a flowchart of a remote sensing image geometric normalization method according to an embodiment of the present disclosure.

FIG. 2 is a flowchart of a remote sensing image geometric normalization method according to an embodiment of the present disclosure. As shown in FIG. 2, the remote sensing image geometric normalization method further includes:

S16: in a case that the result evaluation precision is higher than a preset precision, performing the second geometric correction on the first image processing result in combination with the standard tile set, to obtain a second image result.

Specifically, the image geometric precision evaluation is performed on RPC-corrected medium and high resolution images and geometrically coarsely corrected low resolution images. If the geometric precision does not meet the requirements, a geometric fine correction (the second geometric correction) is performed. The geometric fine correction (the second geometric correction) takes the tile data as a reference, and is carried out by using an automatic image registration method. In actual geometric fine correction (the second geometric correction), an appropriate automatic image matching method is selected according to imaging characteristics and a resolution of the image. For the medium and high resolution images, a feature matching method with scale and rotation invariance may usually be selected, and for the low resolution images, contours of surface features, large rivers, large estuaries, and large lakes with obvious characteristics may be selected for matching. During automatic matching, automatic matching of each tile and corresponding area data of image is completed successively. After the automatic matching is completed, methods such as the RANSAC and the least square fit are used to eliminate wrong control points. After the automatic matching is completed, models such as polynomials and triangulations may be selected for the geometric correction according to geometric deformation characteristics of different images, to output the image with high geometric precision.

Figure 3:
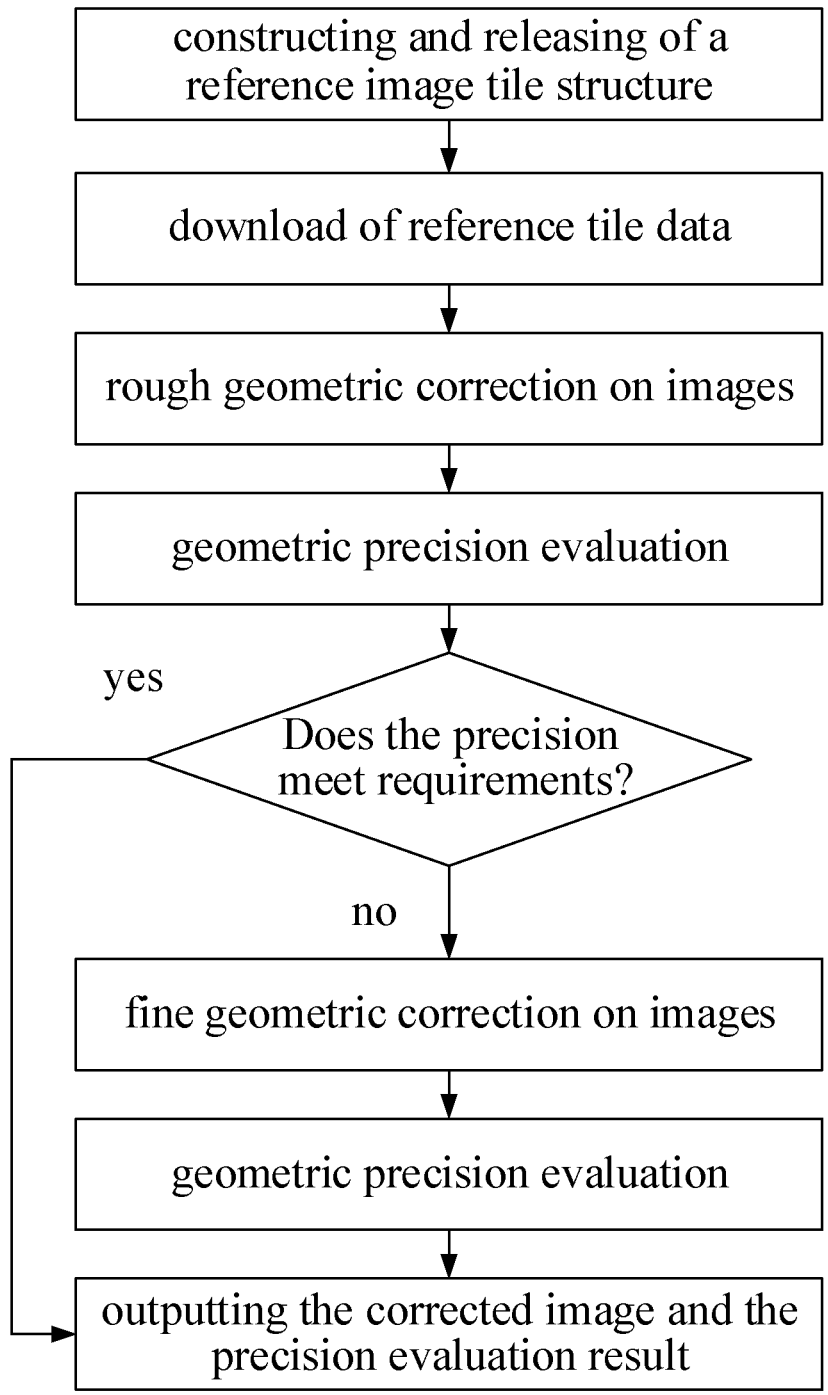
FIG. 3 shows a flowchart of a remote sensing image geometric normalization method according to an embodiment of the present disclosure.

FIG. 3 shows a flowchart of a remote sensing image geometric normalization method according to an embodiment of the present disclosure. As shown in FIG. 3, the remote sensing image geometric normalization method includes the following operations.

(1) Constructing and releasing of a reference image tile structure.
(2) Download of reference tile data.
(3) Rough geometric correction on images (the first geometric correction).
(4) Fine geometric correction on images (the second geometric correction).
(5) Geometric precision evaluation.

Specific implementation details of the above operations have been explained in the foregoing content, and will be not repeated herein again. For details, please refer to the foregoing content. Through the above operations, automatic geometric normalization processing of multi-scale images may be completed. Since the reference data with consistent geometric precision is used, a geometrically normalized image with high geometric precision may be obtained, and a large number of remote sensing images with consistent spatial locations are provided for integrated use of the multi-scale images.

Figure 4:
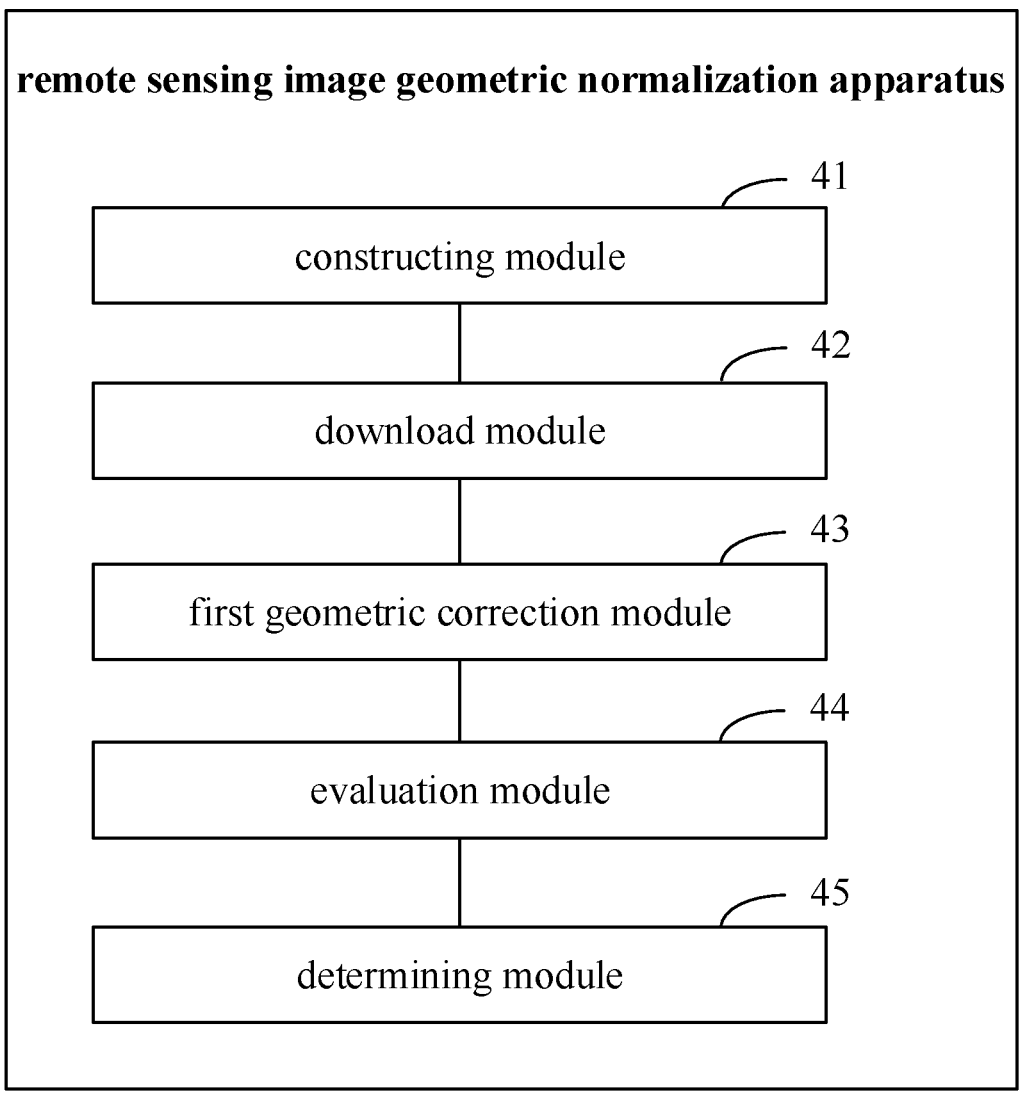
FIG. 4 shows a structural block diagram of a remote sensing image geometric normalization apparatus according to an embodiment of the present disclosure.

FIG. 4 shows a structural block diagram of a remote sensing image geometric normalization apparatus according to an embodiment of the present disclosure, includes:

a constructing module 41, configured for constructing a pyramid tile structure for a reference image, and releasing reference tile data, wherein the reference tile data is data in the pyramid tile structure;

a download module 42, configured for calculating a level of a tile to be downloaded and a name of the tile to be downloaded according to a resolution and geographic coordinates of an image to be subjected to geometrical normalization, and downloading corresponding data from the reference tile data according to the level of the tile to be downloaded and the name of the tile to be downloaded, to obtain a standard tile set;

a first geometric correction module 43, configured for performing a first geometric correction on the image to be subjected to geometrical normalization and tiles in the standard tile set, to obtain a first image processing result;

an evaluation module 44, configured for matching the first image processing result with the tiles in the standard tile set, to obtain a plurality of control points, and calculating a result evaluation precision by using the plurality of control points; and a determining module 45, configured for determining whether to perform a second geometric correction on the first image processing result, according to the result evaluation precision.

Figure 5:
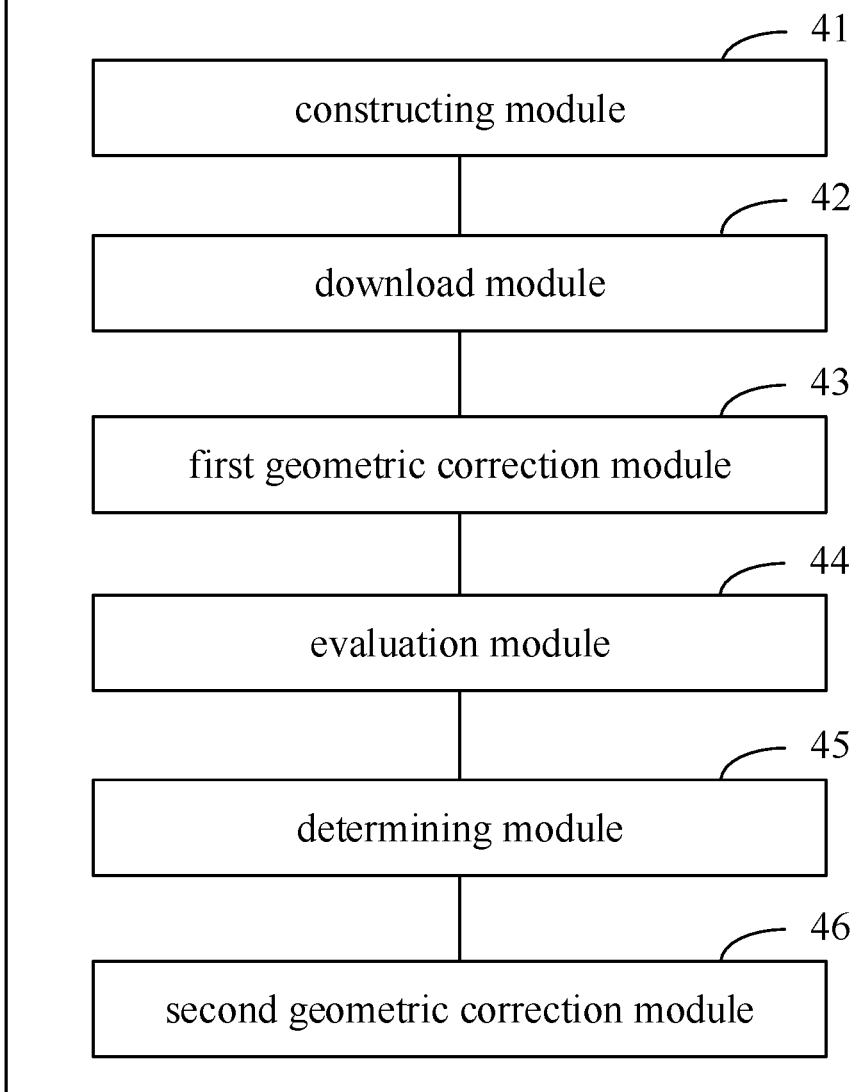
FIG. 5 shows a structural block diagram of a remote sensing image geometric normalization apparatus according to an embodiment of the present disclosure.

FIG. 5 shows a structural block diagram of a remote sensing image geometric normalization apparatus according to an embodiment of the present disclosure.

In an implementation, the apparatus further includes a second geometric correction module 45, configured for: in a case that the result evaluation precision is higher than a preset precision, performing the second geometric correction on the first image processing result in combination with the standard tile set, to obtain a second image result.

Figure 6:
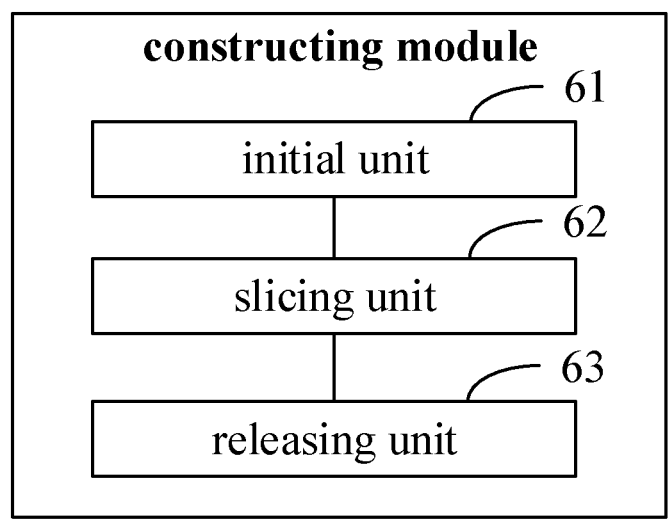
FIG. 6 shows a structural block diagram of a constructing module according to an embodiment of the present disclosure.

FIG. 6 shows a structural block diagram of a constructing module according to an embodiment of the present disclosure.

As shown in FIG. 6, in an implementation, the constructing module 41 includes:

an initial unit 61, configured for determining a number of levels of tiles in a pyramid tile structure to be constructed and an image resolution of each of the levels;

a slicing unit 62, configured for slicing the reference image in accordance with a preset level and a preset resolution to construct the pyramid tile structure; and a releasing unit 63, configured for releasing the reference tile data through a web map tile service protocol.

Figure 7:
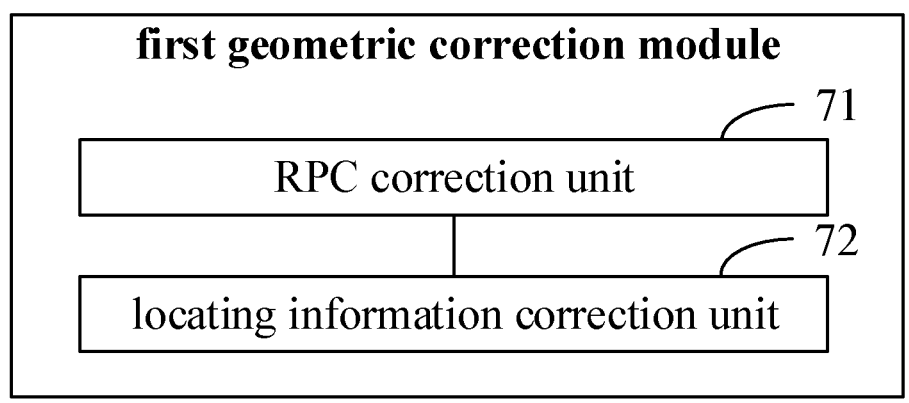
FIG. 7 shows a structural block diagram of a first geometric correction module according to an embodiment of the present disclosure.

FIG. 7 shows a structural block diagram of a first geometric correction module according to an embodiment of the present disclosure.

As shown in FIG. 7, in an implementation, the first geometric correction module 43 includes:

an RPC correction unit 71, configured for: in a case that a resolution of the image to be subjected to geometrical normalization is higher than a preset resolution threshold, performing an RPC correction on the image to be subjected to geometrical normalization; and a locating information correction unit 72, configured for: in a case that the resolution of the image to be subjected to geometrical normalization is lower than or equal to the resolution threshold, performing a correction according to locating information of the image to be subjected to geometrical normalization.

In an implementation, the RPC correction unit is configured for: selecting the tiles from the standard tile set based on a sampling interval, according to an arrangement order of the tiles in the standard tile set, to perform image matching on the image to be subjected to geometrical normalization, to obtain the control points; updating an RPC parameter by using the control points; and performing the RPC correction on the image to be subjected to geometrical normalization by using an updated RPC parameter through a digital elevation model.

In an implementation, the evaluation module 44 is further configured for: calculating a mean square error of the first image processing result relative to the reference image according to the control points, and determining the mean square error as the result evaluation precision;

wherein a formula of calculating the result evaluation precision is:

$$RMSE=\sqrt{(x_i-x_i')^2+(y_i-y_i')^2}$$

wherein RMSE is the evaluation precision, $(x_i, y_i)$ are coordinates of a control point i on the first image processing result, and $(x_i', y_i')$ are coordinates on the first image processing result to which coordinates of the control point i on the reference image are converted according to geographic coordinates.

For functions of each module in each apparatus in the embodiments of the present disclosure, reference may be made to corresponding description in the foregoing method, which are not described herein again.

Various implementations of the systems and techniques described herein may be implemented in a digital electronic circuit system, an integrated circuit system, an application specific integrated circuit (ASIC), computer hardware, firmware, software, and/or a combination thereof.

These computing programs (also referred to as programs, software, software applications, or codes) include machine instructions of a programmable processor, and may be implemented by using high-level procedural and/or object-oriented programming languages, and/or assembly/machine languages. As used herein, the terms "machine-readable medium" and "computer-readable medium" refer to any computer program product, device, and/or apparatus (e.g., a magnetic disk, an optical disk, a memory, a programmable logic device (PLD)) for providing machine instructions and/or data to a programmable processor, including a machine-readable medium that receives machine instructions as machine-readable signals. The term "machine-readable signal" refers to any signal used to provide machine instructions and/or data to a programmable processor.

In order to provide an interaction with a user, the system and technology described here may be implemented on a computer having: a display device (e.g., a cathode ray tube (CRT) or a liquid crystal display (LCD) monitor) for displaying information to the user; and a keyboard and a pointing device (e.g., a mouse or a trackball), through which the user can provide an input to the computer. Other kinds of devices can also be used to provide an interaction with the user. For example, a feedback provided to the user may be any form of sensory feedback (e.g., visual feedback, auditory feedback, or tactile feedback); and an input from the user may be received in any form (including an acoustic input, a voice input, or a tactile input).

The systems and techniques described herein may be implemented in a computing system (e.g., as a data server) that includes a background component, or a computing system (e.g., an application server) that includes a middleware component, or a computing system (e.g., a user computer having a graphical user interface or a web browser through which a user may interact with embodiments of the systems and techniques described herein) that includes a front-end component, or a computing system that includes any combination of such background component, middleware component, or front-end component. The components of the system may be connected to each other through a digital data communication (e.g., a communication network) in any form or medium. Examples of the communication network include a local area network (LAN), a wide area network (WAN), and the Internet.

The computer system may include a client and a server. The client and the server are typically remote from each other and typically interact with each other via the communication network. The relationship of the client and the server is generated by computer programs running on respective computers and having a client-server relationship with each other.

It should be understood that the operations can be reordered, added or deleted using the various flows illustrated above. For example, various operations described in the present disclosure may be performed concurrently, sequentially or in a different order, so long as the desired results of the technical solutions disclosed in the present disclosure can be achieved, which is not limited herein.

The above-mentioned specific implementations do not constitute the limit of the protection scope of the present disclosure. It will be apparent to those skilled in the art that various modifications, combinations, sub-combinations, and substitutions are possible, depending on design requirements and other factors. Any modifications, equivalent substitutions, improvements, and the like within the spirit and principle of the present disclosure are intended to be included within the protection scope of the present disclosure.

What is claimed is:

1. A remote sensing image geometric normalization method, comprising:

constructing a pyramid tile structure including tiles for a reference remote sensing image of remote sensing images, and releasing reference tile data, wherein the reference tile data is data of tails in the pyramid tile structure corresponding to tiles of the reference remote sensing image;

calculating a level of a tile to be downloaded and a name of the tile to be downloaded according to a resolution and geographic coordinates of a remote sensing image to be subjected to geometrical normalization of the remote sensing images, and downloading corresponding data corresponding to the tile to be downloaded from the reference tile data according to the level of the tile to be downloaded and the name of the tile to be downloaded, to obtain a standard tile data set including data corresponding to the tile to be downloaded;

performing a first geometric correction on the remote sensing image to be subjected to geometrical normalization and tiles in the standard tile set, to obtain a first image processing result;

matching the first image processing result with the tiles in the standard tile set, to obtain a plurality of control points, and calculating a result evaluation precision by using the plurality of control points; and determining whether to perform a second geometric correction on the first image processing result, according to the result evaluation precision.

2. The method of claim 1, further comprising:
in a case that the result evaluation precision is higher than a preset precision, performing the second geometric correction on the first image processing result in combination with the standard tile set, to obtain a second image result; and
in a case that the result evaluation precision is not higher than a preset precision, not performing the second geometric correction on the first image processing result.

3. The method of claim 1, wherein constructing the pyramid tile structure including tiles for the reference remote sensing image of the remote sensing images, and releasing the reference tile data, comprises:
determining a number of levels of tiles in the pyramid tile structure to be constructed for the reference remote sensing image and an image resolution of each of the levels;
slicing the reference remote sensing image in accordance with a preset level and a preset resolution of the tiles in the pyramid tile structure to be constructed for the reference remote sensing image, to construct the pyramid tile structure for the reference remote sensing image; and
releasing the reference tile data through a web map tile service protocol.

4. The method of claim 1, wherein the performing the first geometric correction on the remote sensing image to be subjected to geometrical normalization and the tiles in the standard tile set, comprises:
in a case that a resolution of the remote sensing image to be subjected to geometrical normalization is higher than a preset resolution threshold, performing a rational polynomial coefficients (RPC) correction on the remote sensing image to be subjected to geometrical normalization; and
in a case that the resolution of the remote sensing image to be subjected to geometrical normalization is lower than or equal to the resolution threshold, performing a correction according to locating information of the remote sensing image to be subjected to geometrical normalization, wherein the locating information includes longitude data and latitude data of the remote sensing image to be subjected to geometrical normalization.

5. The method of claim 4, wherein the performing the RPC correction on the remote sensing image to be subjected to geometrical normalization, comprises:
selecting the tiles from the standard tile set based on a sampling interval, according to an arrangement order of the tiles in the standard tile set, to perform image matching on the remote sensing image to be subjected to geometrical normalization, to obtain the control points;
updating an RPC parameter by using the control points, to obtain an updated RPC parameter; and
performing the RPC correction on the remote sensing image to be subjected to geometrical normalization by using the updated RPC parameter through a digital elevation model.

6. The method of claim 1, wherein the calculating the result evaluation precision by using the plurality of control points, comprises:
calculating a mean square error of the first image processing result relative to the reference remote sensing image according to the control points, and determining the mean square error as the result evaluation precision;
wherein a formula of calculating the result evaluation precision is:

$$RMSE=\sqrt{(x_i-x'_i)^2+(y_i-y'_i)^2}$$

wherein Root-Mean-Square Error (RMSE) is the evaluation precision, $(x_i, y_i)$ are coordinates of a control point i of the plurality of control points on the first image processing result, and $(x'_i, y'_i)$ are coordinates on the first image processing result to which coordinates of the control point i on the reference remote sensing image are converted according to geographic coordinates.

7. A remote sensing image geometric normalization apparatus, comprising:
one or more processors; and
a storage apparatus, configured for storing one or more programs, wherein
the one or more programs, when executed by the one or more processors, enable the one or more processors to implement operations of:
constructing a pyramid tile structure including tiles for a reference remote sensing image of remote sensing images, and releasing reference tile data, wherein the reference tile data is data of tails in the pyramid tile structure corresponding to tiles of the reference remote sensing image;
calculating a level of a tile to be downloaded and a name of the tile to be downloaded according to a resolution and geographic coordinates of a remote sensing image to be subjected to geometrical normalization of the remote sensing images, and downloading corresponding data corresponding to the tile to be downloaded from the reference tile data according to the level of the tile to be downloaded and the name of the tile to be downloaded, to obtain a standard tile data set including data corresponding to the tile to be downloaded;
performing a first geometric correction on the remote sensing image to be subjected to geometrical normalization and tiles in the standard tile set, to obtain a first image processing result;
matching the first image processing result with the tiles in the standard tile set, to obtain a plurality of control points, and calculating a result evaluation precision by using the plurality of control points; and determining whether to perform a second geometric correction on the first image processing result, according to the result evaluation precision.

8. A non-transitory computer-readable storage medium storing a computer program, wherein the computer program, when executed by a processor, implements operations of:
constructing a pyramid tile structure including tiles for a reference remote sensing image of remote sensing images, and releasing reference tile data, wherein the reference tile data is data of tails in the pyramid tile structure corresponding to tiles of the reference remote sensing image;
calculating a level of a tile to be downloaded and a name of the tile to be downloaded according to a resolution and geographic coordinates of a remote sensing image to be subjected to geometrical normalization of the remote sensing images, and downloading corresponding data corresponding to the tile to be downloaded from the reference tile data according to the level of the tile to be downloaded and the name of the tile to be downloaded, to obtain a standard tile data set including data corresponding to the tile to be downloaded;
performing a first geometric correction on the remote sensing image to be subjected to geometrical normalization and tiles in the standard tile set, to obtain a first image processing result;
matching the first image processing result with the tiles in the standard tile set, to obtain a plurality of control points, and calculating a result evaluation precision by using the plurality of control points; and determining whether to perform a second geometric correction on the first image processing result, according to the result evaluation precision.

9. The apparatus of claim 7, wherein the one or more programs, when executed by the one or more processors, enable the one or more processors to further implement an operation of:
in a case that the result evaluation precision is higher than a preset precision, performing the second geometric correction on the first image processing result in combination with the standard tile set, to obtain a second image result; and
in a case that the result evaluation precision is not higher than a preset precision, not performing the second geometric correction on the first image processing result.

10. The apparatus of claim 7, wherein constructing pyramid tile structure including tiles for the reference remote sensing image of the remote sensing images, and releasing the reference tile data, comprises:
determining a number of levels of tiles in the pyramid tile structure to be constructed for the reference remote sensing image and an image resolution of each of the levels;
slicing the reference remote sensing image in accordance with a preset level and a preset resolution of the tiles in the pyramid tile structure to be constructed for the reference remote sensing image, to construct the pyramid tile structure for the reference remote sensing image; and
releasing the reference tile data through a web map tile service protocol.

11. The apparatus of claim 7, wherein the performing the first geometric correction on the remote sensing image to be subjected to geometrical normalization and the tiles in the standard tile set, comprises:
in a case that a resolution of the remote sensing image to be subjected to geometrical normalization is higher than a preset resolution threshold, performing a rational polynomial coefficients (RPC) correction on the remote sensing image to be subjected to geometrical normalization; and
in a case that the resolution of the remote sensing image to be subjected to geometrical normalization is lower than or equal to the resolution threshold, performing a correction according to locating information of the remote sensing image to be subjected to geometrical normalization, wherein the locating information includes longitude data and latitude data of the remote sensing image to be subjected to geometrical normalization.

12. The apparatus of claim 11, wherein the performing the RPC correction on the remote sensing image to be subjected to geometrical normalization, comprises:
selecting the tiles from the standard tile set based on a sampling interval, according to an arrangement order of the tiles in the standard tile set, to perform image matching on the remote sensing image to be subjected to geometrical normalization, to obtain the control points;
updating an RPC parameter by using the control points, to obtain an updated RPC parameter; and
performing the RPC correction on the remote sensing image to be subjected to geometrical normalization by using the updated RPC parameter through a digital elevation model.

13. The apparatus of claim 7, wherein the calculating the result evaluation precision by using the plurality of control points, comprises:
calculating a mean square error of the first image processing result relative to the reference remote sensing image according to the control points, and determining the mean square error as the result evaluation precision;
wherein a formula of calculating the result evaluation precision is:

$$\mathrm{RMSE} = \sqrt{(x_i - x'_i)^2 + (y_i - y'_i)^2}$$

wherein Root-Mean-Square Error (RMSE) is the evaluation precision, $(x_i, y_i)$ are coordinates of a control point i of the plurality of control points on the first image processing result, and $(x'_i, y'_i)$ are coordinates on the first image processing result to which coordinates of the control point i on the reference remote sensing image are converted according to geographic coordinates.

14. The non-transitory computer-readable storage medium of claim 8, wherein the computer program, when executed by the processor, further implements an operation of:
in a case that the result evaluation precision is higher than a preset precision, performing the second geometric correction on the first image processing result in combination with the standard tile set, to obtain a second image result; and
in a case that the result evaluation precision is not higher than a preset precision, not performing the second geometric correction on the first image processing result.

15. The non-transitory computer-readable storage medium of claim 8, wherein constructing the pyramid tile structure including tiles for the reference remote sensing image of the remote sensing images, and releasing the reference tile data, comprises:
- determining a number of levels of tiles in the pyramid tile structure to be constructed for the reference remote sensing image and an image resolution of each of the levels;
- slicing the reference remote sensing image in accordance with a preset level and a preset resolution of the tiles in the pyramid tile structure to be constructed for the reference remote sensing image, to construct the pyramid tile structure for the reference remote sensing image; and
- releasing the reference tile data through a web map tile service protocol.

16. The non-transitory computer-readable storage medium of claim 8, wherein the performing the first geometric correction on the remote sensing image to be subjected to geometrical normalization and the tiles in the standard tile set, comprises:
- in a case that a resolution of the remote sensing image to be subjected to geometrical normalization is higher than a preset resolution threshold, performing a rational polynomial coefficients (RPC) correction on the remote sensing image to be subjected to geometrical normalization; and
- in a case that the resolution of the remote sensing image to be subjected to geometrical normalization is lower than or equal to the resolution threshold, performing a correction according to locating information of the remote sensing image to be subjected to geometrical normalization, wherein the locating information includes longitude data and latitude data of the remote sensing image to be subjected to geometrical normalization.

17. The non-transitory computer-readable storage medium of claim 16, wherein the performing the RPC correction on the remote sensing image to be subjected to geometrical normalization, comprises:
- selecting the tiles from the standard tile set based on a sampling interval, according to an arrangement order of the tiles in the standard tile set, to perform image matching on the remote sensing image to be subjected to geometrical normalization, to obtain the control points;
- updating an RPC parameter by using the control points, to obtain an updated RPC parameter; and
- performing the RPC correction on the remote sensing image to be subjected to geometrical normalization by using the updated RPC parameter through a digital elevation model.

18. The non-transitory computer-readable storage medium of claim 8, wherein the calculating the result evaluation precision by using the plurality of control points, comprises:
- calculating a mean square error of the first image processing result relative to the reference remote sensing image according to the control points, and determining the mean square error as the result evaluation precision;
- wherein a formula of calculating the result evaluation precision is:

$$\text{RMSE} = \sqrt{(x_i - x'_i)^2 + (y_i - y'_i)^2}$$

wherein Root-Mean-Square Error (RMSE) is the evaluation precision, $(x_i, y_i)$ are coordinates of a control point i of the plurality of control points on the first image processing result, and $(x'_i, y'_i)$ are coordinates on the first image processing result to which coordinates of the control point i on the reference remote sensing image are converted according to geographic coordinates.

* * * * *